United States Patent
Koyama et al.

[11] Patent Number: 6,139,473
[45] Date of Patent: Oct. 31, 2000

[54] ACTION INPUT DEVICE FOR SIMULATOR, AND SIMULATOR USING THE SAME

[75] Inventors: Junichiro Koyama, Yokohama; Shinichiro Aiki, Kawasaki, both of Japan

[73] Assignee: Namco Ltd., Tokyo, Japan

[21] Appl. No.: 09/066,445

[22] PCT Filed: Sep. 11, 1997

[86] PCT No.: PCT/JP97/03203

§ 371 Date: Jun. 4, 1998

§ 102(e) Date: Jun. 4, 1998

[30] Foreign Application Priority Data

Sep. 11, 1996 [JP] Japan ................................. 8-262402

[51] Int. Cl.[7] .................................................. A63B 22/08
[52] U.S. Cl. .................................. 482/8; 482/51; 482/71
[58] Field of Search .............................. 482/8, 51, 70, 482/52, 71, 111, 112, 146, 147, 79, 145

[56] References Cited

U.S. PATENT DOCUMENTS

| | | |
|---|---|---|
| 4,396,189 | 8/1983 | Jenkins . |
| 5,536,225 | 7/1996 | Neuberg et al. ......................... 482/71 |
| 5,665,033 | 9/1997 | Palmer .................................... 482/71 |
| 5,690,591 | 11/1997 | Kenmochi et al. ...................... 482/71 |
| 5,813,864 | 9/1998 | Ikuta ...................................... 482/71 |

FOREIGN PATENT DOCUMENTS

| | | |
|---|---|---|
| 50-5145 | 1/1975 | Japan . |
| 61-34270 | 3/1986 | Japan . |
| 6-34668 | 5/1994 | Japan . |
| Y2-2524836 | 11/1996 | Japan . |
| 9-742 | 1/1997 | Japan . |

*Primary Examiner*—Glenn E. Richman
*Attorney, Agent, or Firm*—Oliff & Berridge, PLC

[57] ABSTRACT

The present invention provides an action input device for a simulator that requires only a small installation space but can provide an extremely realistic experience.

This travel simulator comprises a base portion 40, an input board 20 on which the player stands and rides, and an oscillatory mechanism that attaches the input board 20 in a freely oscillatory manner to the base portion 40, to form a travel simulator in which the input board 20 is made to oscillate in the leftward and rightward direction to control the direction of movement of a virtual player in the leftward and rightward direction. This oscillatory mechanism comprises a moving portion 60 attached to the base portion 40 in such a manner it can move in the forward and backward direction, a first support portion 90 that supports the input board 20 on the moving portion 60 in a freely rotatable manner, a second support portion 110 in front of the first support portion 90 that supports the input board 20 so as to be freely movable along a given movement track orientated in the leftward and rightward direction, and springs 80 for urging the moving portion to move rearward.

20 Claims, 8 Drawing Sheets

ACTION INPUT DEVICE FOR SIMULATOR, AND SIMULATOR USING THE SAME

TECHNICAL FIELD

The present invention relates to an action input device for a simulator and a simulator that uses such an input device.

BACKGROUND OF ART

A ski game machine is known in the art, wherein a player rides on a board that represents skis to simulate skiing. In particular, a ski game machine has recently been developed in which an input board that represents skis is used as an input means, virtual skiing is provided within a virtual three dimensional space, and the state thereof is shown on a display.

With this ski game machine the input board on which the player rides is attached to a base in such a manner that it is free to rotate towards the left and right. The player mounted on this board plays the game by causing the board to rotate to the left or right while viewing travelling images of a virtual player shown on the display, thus controlling the direction of travel of the virtual player to the left or right.

It is desirable that this type of game machine should be installed efficiently in the limited installation space available in places such as game centers.

However, this game machine uses a configuration in which the input board is attached in such a manner that it is simply free to rotate along a circular track. This raises a problem in that it is necessary to provide sufficient installation space for the width of the circular track of the input board.

It is possible to make the entire apparatus more compact by limiting the rotational angle of this input board. However, this decreases the operability of the game machine as a ski game, raising the problem of a reduction in interest of the game.

The input board of this ski game machine is simply supported axially so that it is free to rotate along a circular track. This means that it is not possible to impart to the player the physical sensation of turning while side-slipping, which can be done in real-life skiing, which is one reason why the reality of this game is impaired.

DISCLOSURE OF INVENTION

The present invention was devised in the light of the above problems, and has as an objective thereof the provision of an action input device for a simulator that can be set up in a reduced installation space but gives a highly realistic feeling, and a simulator that uses such an input device.

In order to achieve the above objective, the action input device for a travel simulator in accordance with the present invention comprises:

a base member;

an oscillatory stand formed as a pedestal on which a player stands and rides; and an oscillatory mechanism for attaching the oscillatory stand to the base member and for enabling the oscillatory stand to oscillate in a lateral direction; and wherein the oscillatory stand is caused to oscillate laterally to control a virtual travel direction laterally; and wherein the oscillatory mechanism of the action input device for a simulator comprises:

a movable member attached to the base member so as to be capable of moving in the longitudinal direction;

a first support portion for supporting a first pivot of the oscillatory stand on the movable member in a freely rotatable manner;

a second support portion in front of the first support portion, for supporting a second pivot of the oscillatory stand so as to be freely movable along a given movement track orientated in the lateral direction; and elastic means for urging the moving member to move rearward.

In this case, the oscillatory stand is preferably modeled in accordance with the objective of the simulator. For example, the oscillatory stand may be modeled to represent at least one of skis, a snowboard, and a skateboard.

The oscillatory stand of the action input device of the present invention is formed as a pedestal on which the player rides. The player riding on this oscillatory stand uses his or her legs to oscillate the oscillatory stand in the lateral direction, to control a virtual traveller to move to the left or right.

This oscillatory stand is attached on top of a base member by an oscillatory mechanism. This oscillatory mechanism attaches the oscillatory stand on top of the base member, with the first and second pivots therebetween.

The first pivot is rotatably supported on the movable member which moves in the forward and backward direction on the base member, with the first support portion therebetween.

The second pivot is placed forward of the first support portion and is attached to the second support portion which moves along a given movement track orientated in the leftward and rightward direction.

Since this movable member is normally given an elastic force to move rearward by the elastic member, that elastic force automatically returns the oscillatory stand to a given neutral point in a state in which no external force is applied to the oscillatory stand.

When the player oscillates the oscillatory stand to the right or left from this state, the oscillatory stand rotates about the first pivot rotation as a center of, in answer to that action. This oscillatory stand is supported at two points by first and second support portions. Therefore, the first pivot moves forward together with the movable member in answer to that oscillatory action, and the second pivot moves toward the left or right along the movement track, together with the second support portion.

In other words, when the oscillatory stand is swung in the counterclockwise direction, the first pivot moves forward and the second pivot moves to the left, in answer thereto. If the oscillatory stand is swung in the clockwise direction, the first pivot moves forward and the second pivot moves to the right.

This means that, when the oscillatory stand is swung to the right or left, the second pivot that is the center of rotation thereof moves in the opposite direction, in other words, to the left or right. This makes it possible to greatly reduce the movement range of the oscillatory stand in the widthwise direction. As a result, it makes it possible to make the entire apparatus more compact and greatly reduce the installation space required for the simulator.

In addition, the present invention makes it possible to cause the oscillatory stand to move in the forward and backward direction in answer to this oscillatory action. It is therefore possible to reproduce a side-slipping sensation to match a turn, simulate an active feeling that is similar to that of real-life skis or a snowboard, and thus impart physical sensations to the player, making it possible to implement a far more realistic simulator.

In this case, the movement track is preferably formed in such a manner that a neutral point at which the second support portion is stably positioned lies on a line extended from the direction of movement of the movable member, in a state in which no external force is applied to the oscillatory stand.

This ensures that the oscillatory stand is automatically set in such a manner that it is orientated in the same direction as the direction of movement of the movable member. As a result, the player can perform oscillatory actions while balanced in both the right and left directions.

Any of various methods could be employed as necessary for setting this movement truck.

In a further aspect of the present invention, the apparatus may further comprise:

a rotational body supported in a freely rotatable manner on the base member at a third pivot positioned forward of the direction of movement of the movable member; and wherein the second support portion supports the second pivot of the oscillatory stand at a rotational end side of the rotational body.

In a still further aspect of the present invention, the apparatus may further comprise:

a movement path formed in the base member along the movement track; and wherein the second support portion is formed to be freely movable along the movement path.

In the first of the above two aspects of the present invention, the movement truck is determined to be shaped as a circular arc centered on the third pivot, but in the second one, the movement track can be set to be any path, as necessary.

Note that in the second of the above two aspects, the action input device could be formed as described below, when the movement track is set in the same manner as in the first of these aspects.

In other words, the movement path may be formed along a circular-arc-shaped movement track that is centered on an imaginary third pivot positioned in front of the direction of movement of the movable member.

The oscillatory mechanism preferably comprises a locking means for regulating the oscillation of the oscillatory stand.

Such a configuration makes it possible to use the locking means to lock the oscillation of the oscillatory stand when the action input device is not in action.

This locking means could be a mechanism that locks at least one of the movement of the movable member in the forward and backward direction or the movement of the oscillatory stand in the leftward and rightward direction. A mechanism that uses a solenoid to move a stopper, for example, could be used as this a locking means, but it is preferable to employ a configuration that is capable of halting the oscillatory mechanism gently when the game is over.

An electromagnetic brake, air pressure cylinder, magnetic fluid damper, oil damper, or thrust motor could be used as necessary as this means, provided it controls the oscillation of the oscillatory stand gently.

In a yet further aspect of the present invention, the oscillatory mechanism may comprise a resistance imparting means for imparting a resistance to oscillation to the oscillatory stand.

Such a configuration makes it possible to control the resistance to oscillation of the oscillatory stand in answer to the status of the simulator, so that an even more realistic action input feeling can be implemented as a result. During a skiing simulation, for example, it is possible to make the player feel physical sensations that match imagined snow conditions, by controlling the resistance to oscillation in answer to such snow conditions.

A simulator in accordance with the present invention is designed to use one of the above described the action input devices of the present invention.

Use of the above configurations makes it possible to implement various realistic simulators, such as ski, snowboard, skateboard, and other simulator.

BEST MODE FOR CARRYING OUT THE INVENTION

Preferred embodiments of the present invention are described in detail below.

Figure 1:
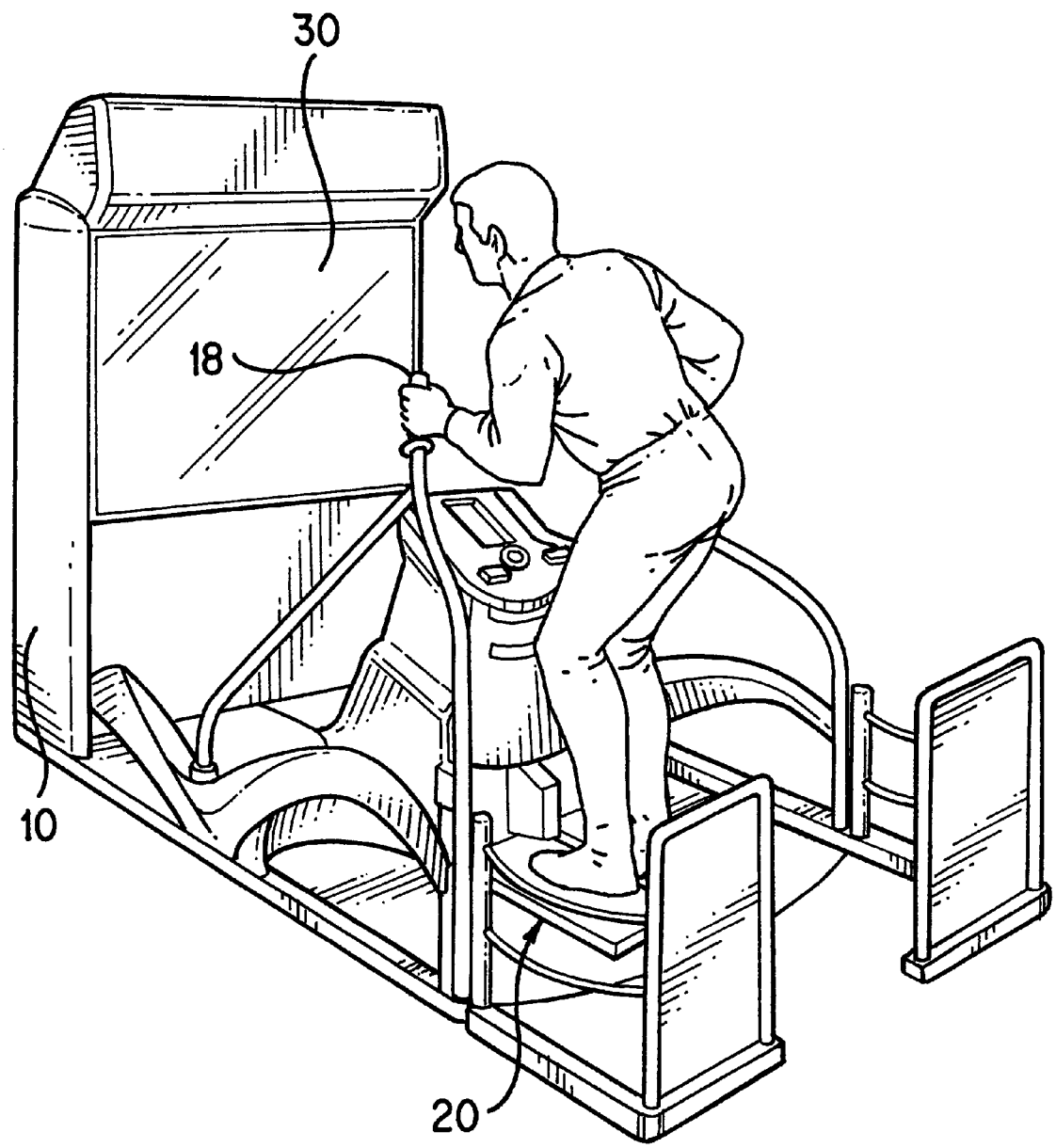
FIG. 1 is a perspective illustrative view of a preferred example of a ski game machine to which the present invention is applied.
Figure 2A:
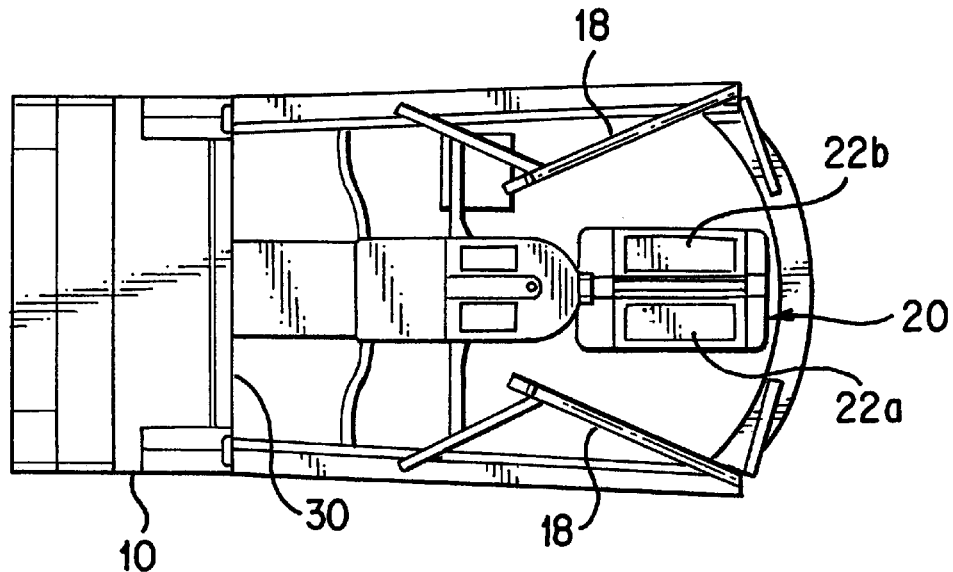
FIG. 2A is a schematic plan view of the game machine of FIG. 1.
Figure 2B:
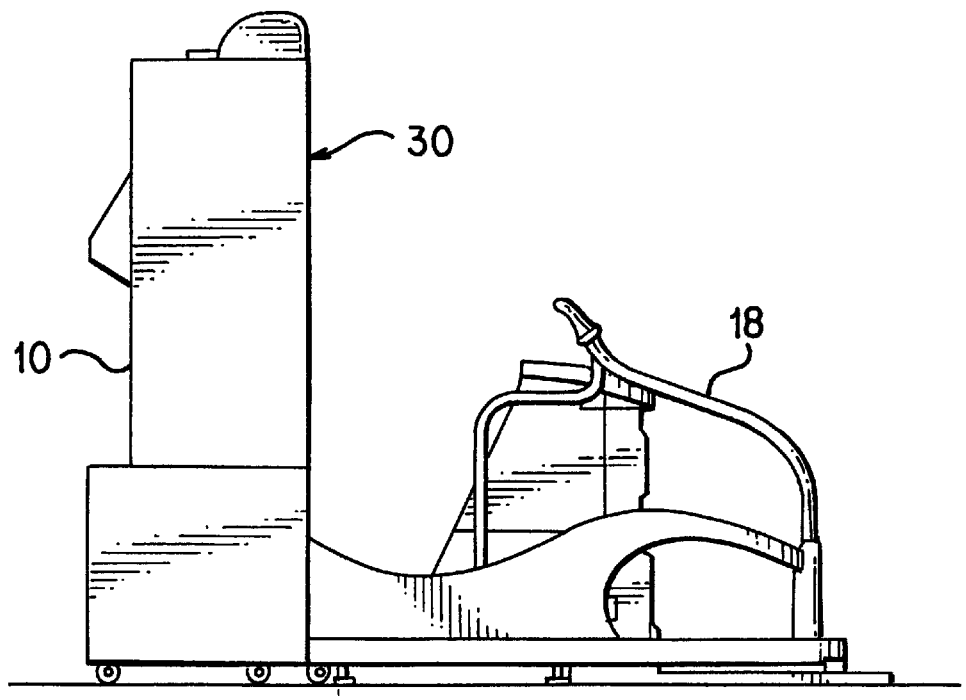
FIG. 2B is a schematic side view thereof.

A preferred example of an arcade type of ski game machine to which the present invention is applied is shown in FIG. 1. A plan view thereof is shown in FIG. 2A and a side view in FIG. 2B.

The ski game machine of the present embodiment has an input board 20 representing skis with a display 30 disposed at the front thereof.

Figure 4A:
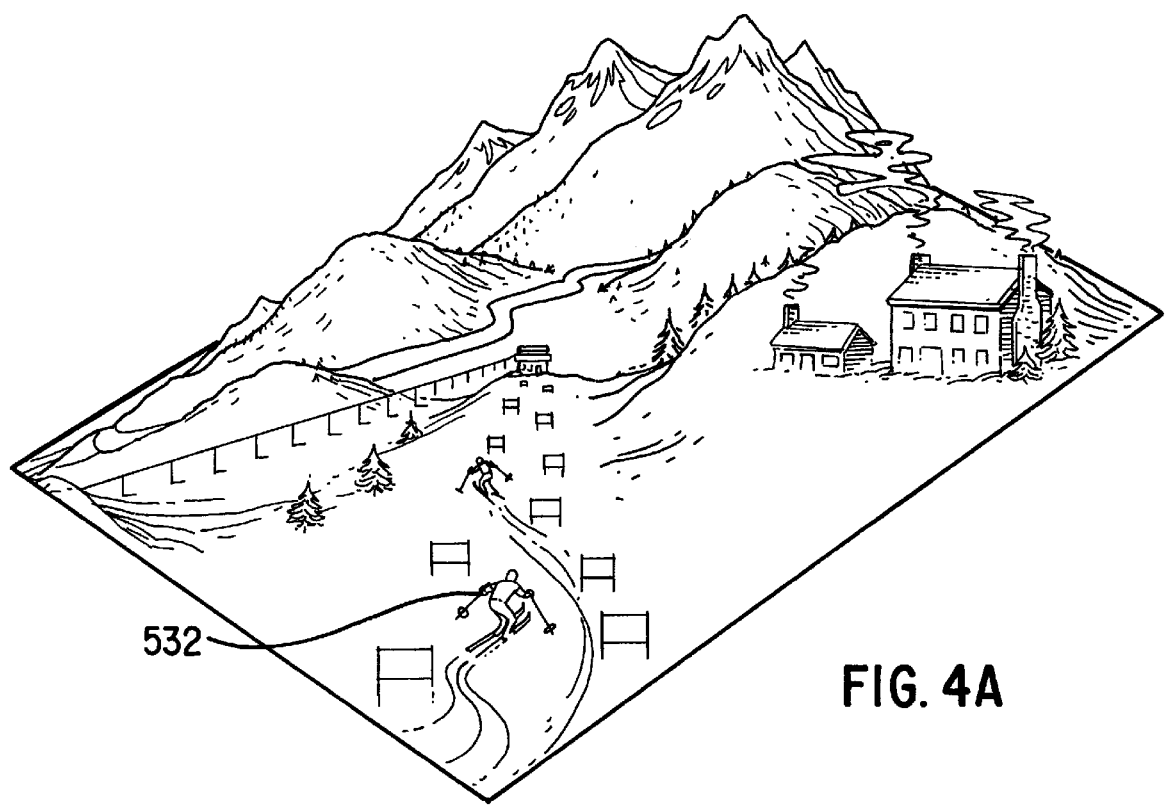
FIG. 4A is an illustrative view of a game space of the game machine of the present embodiment and FIG. 4B is an illustrative view of a typical game screen that is shown on the display.
Figure 4B:
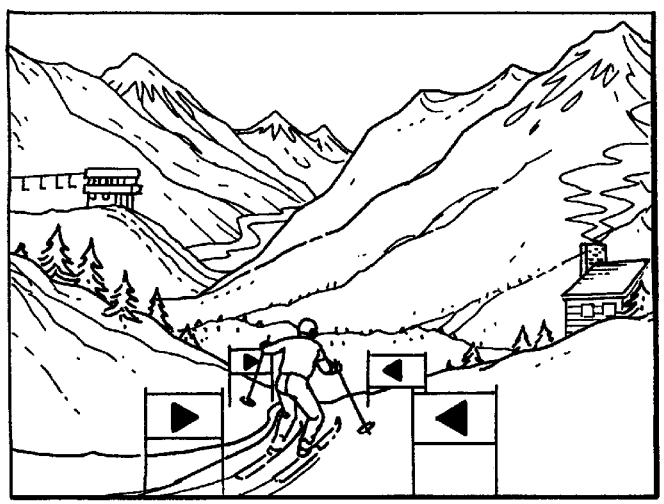

This display 30 shows the view as seen in front of a virtual player 532 as the game screen shown by way of example in FIG. 4B, within a previously set three dimensional game space, as shown in FIG. 4A.

Two ski poles 18 that represent the ski poles used by a skier are fixed to a housing 10 of the game machine, with the configuration being such that the player is able to support his or her body by grasping these left and right ski poles 18.

By standing with both feet on left and right footplates 22a and 22b of the input board 20 and with both hands grasping the left and right ski poles 18, the player can support his or her body and make the turning actions required for skiing.

These turning actions are Performed by using an action input portion. The action input portion of the present embodiment is configured in such a manner that the player can perform a rotational operation that causes the input board 20 to rotate in the horizontal direction and an edging operation that causes the left and right footplates 22a and 22b to tilt. The magnitudes of these operations are detected by sensors and the virtual direction of travel of the virtual player is controlled according to detection signals therefrom.

Thus the player can perform turning actions by using the input board 20 so as to proceed through a game, enabling a virtual simulation of a state in which he or she is on skis and is skiing within a three dimensional game space.

Figure 3:
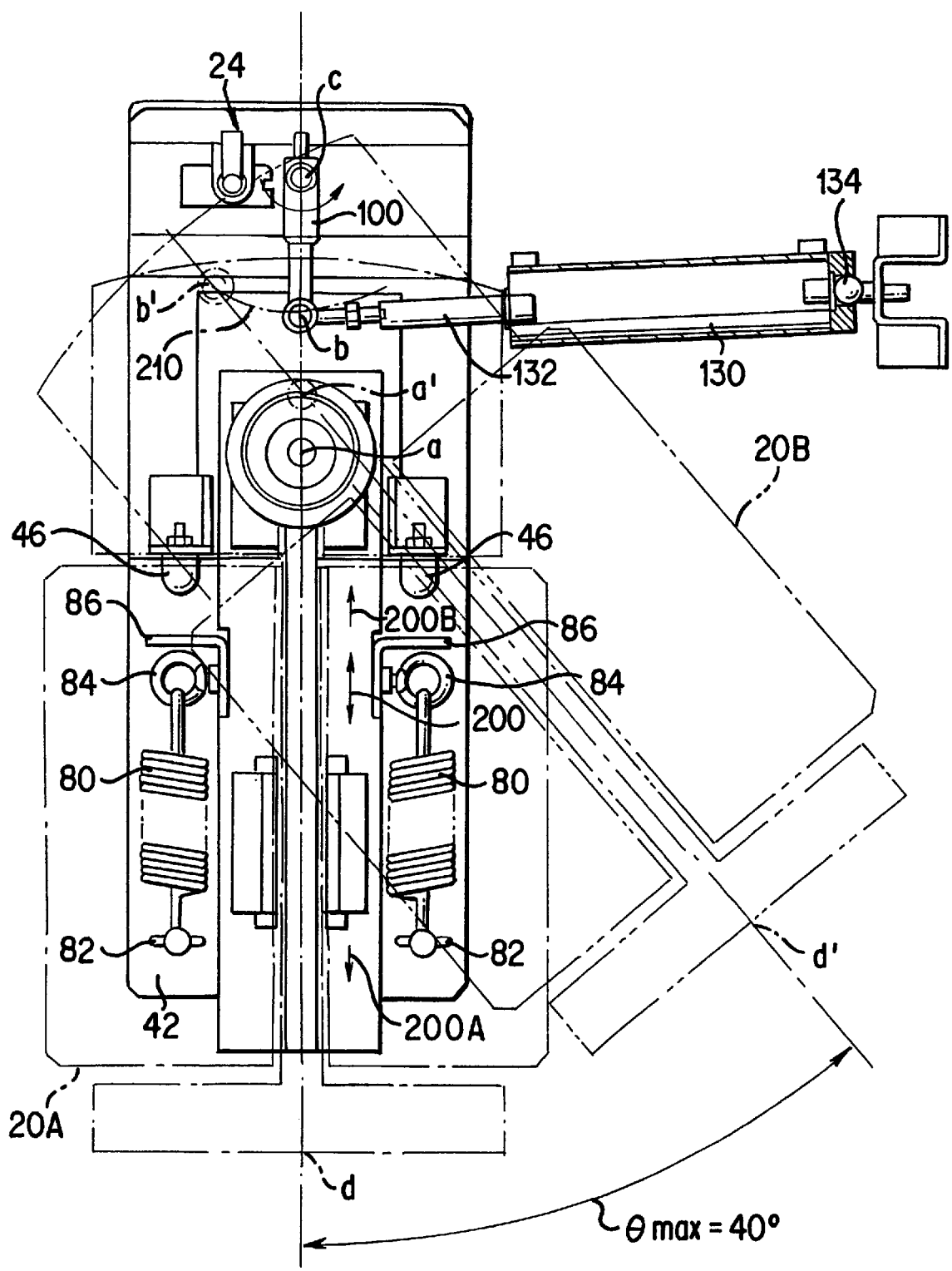
FIG. 3 is a schematic plan view illustrating the oscillatory mechanism of the game machine of FIG. 1.

The above mentioned rotational operation of the input board 20 is illustrated in FIG. 3. The input board 20 of the present embodiment is positioned close to the floor surface and is directed towards the display 30. The input board 20 is also fixed so as to be freely rotatable with respect to the housing 10, and thus can perform the above rotational operation This rotational operation is set up in such a manner that, if a position of the input board 20A, shown by broken lines in FIG. 3, is a basic position at which an angle of swing θ thereof is zero, the board can be moved within a oscillatory range of up to 40 degrees (position 20B) to either side of this basic position. In this case, the basic position is a position in which the player's entire body is facing directly towards the display 30, when riding on the input board 20.

The rotational angle θ of this rotational operation is detected by a swing sensor 24 provided in an oscillatory mechanism. The swing sensor 24 comprises a variable resistor of volume type and detects the angle of swing θ in the horizontal direction of the input board 20 as a resistance.

This input board 20 is configured in such a manner that it is given an elastic force normally when positioned at a basic position at which the angle of swing θ is zero (the state shown at 20A in FIG. 3), as will be described later, and a restorative force towards the basic position increases as the angle of swing θ becomes greater.

Since the player performs sideways rotational operations of the input board 20 against the elastic force, the player can perform turning actions while experiencing the same sort of loading on the legs as that of skiing in real life.

A first embodiment of this action input portion is described below.

The action input portion of the present embodiment comprises a base portion 40 that forms part of the housing 10, a moving portion 60 attached on top of the base portion 40 so as to be freely movable in the forward and backward direction as shown by arrows 200 in the figure, and the input board 20 that acts as an oscillatory stand and is attached on top of the moving portion 60 in a freely rotatable manner with a first support portion 90 therebetween acting as a first pivot.

This base portion 40 is a portion that is installed on a floor surface positioned underneath the input board 20. A base plate 42 is attached firmly and integrally on top of this base portion 40.

The moving portion 60 comprises a slide rail 62 and a slide table 66 that is integrally attached to this slide rail 62. This slide rail 62 is attached in a freely slidable manner to a pair of rail support portions 64 that are disposed on the base plate 42 at a given spacing and aligned in the direction of the arrows 200 in the figure.

The slide table 66 is therefore able to slide in the direction of the arrows 200 on the base plate 42, integrally with the slide rail 62. The movement of the slide table 66 in the forward direction (the direction shown by an arrow 200B) is regulated by a pair of stoppers 46 provided on the base plate 42. In other words, this two stoppers 46 are disposed on the base plate 42 at positions on either side of the slide table 66, as shown in FIG. 3. Two contacting members 86 are provided on either side of the slide table 66 facing the stoppers 46, to regulate the motion of the slide table 66 in the forward direction 200B. This regulation of the motion is designed to regulate the angle of swing of the input board 20 to within a given range (within a maximum angle of swing of 40 degrees) as will be described later.

The action input portion of the present embodiment is also provided with a pair of springs 80 acting as elastic members. These pair of springs 80 are extended between hooks 82 provided at the rear end of the base portion 42 and hooks 84 provided on either side of the slide table 66, in a configuration that always urges the slide table 66 to move in the rearward direction 200A.

This input board 20 is attached in a freely rotatable manner on top of the slide table 66, with the first support portion 90 therebetween, as previously described.

The first support portion 90 comprises a bearing table 94 that is attached in a freely rotatable manner to the forward end of the slide table 66, with a bearing 92 therebetween. In this case, the bearing table 94 is attached to the bearing 92 in such a manner that a central axis of a hole 96 provided at a rear end thereof coincides with the center of rotation of the bearing 92.

This bearing table 94 is fixed integrally to an attachment portion 26 positioned at the forward end of the input board 20. This ensures that the input board 20 is supported in a freely rotatable manner with respect to the slide table 66, centered on the rotational axis of the first support portion 90, in other words, on a first rotational axis a.

The action input portion of the present embodiment also comprises a rotational arm 100 that is fixed in a freely rotatable manner to the forward end of the base plate 42. The forward end of the bearing table 94 is attached in a freely rotatable manner to the tip end of this rotational arm 100, with a second support portion 110 therebetween.

The rotational arm 100 is attached on the base plate 42 in such a manner that it rotates about the center of a third rotational axis c positioned on a line extending forward from the slide rail 62.

The second support portion 110 is configured to use a link ball for linking the tip end of the rotational arm 100 to the forward end of the bearing table 94. In this case, the rotational axis of this link ball is taken to be a second rotational axis b.

The action input portion of the present embodiment is configured as described above, with the operation thereof being as follows.

Figure 6:
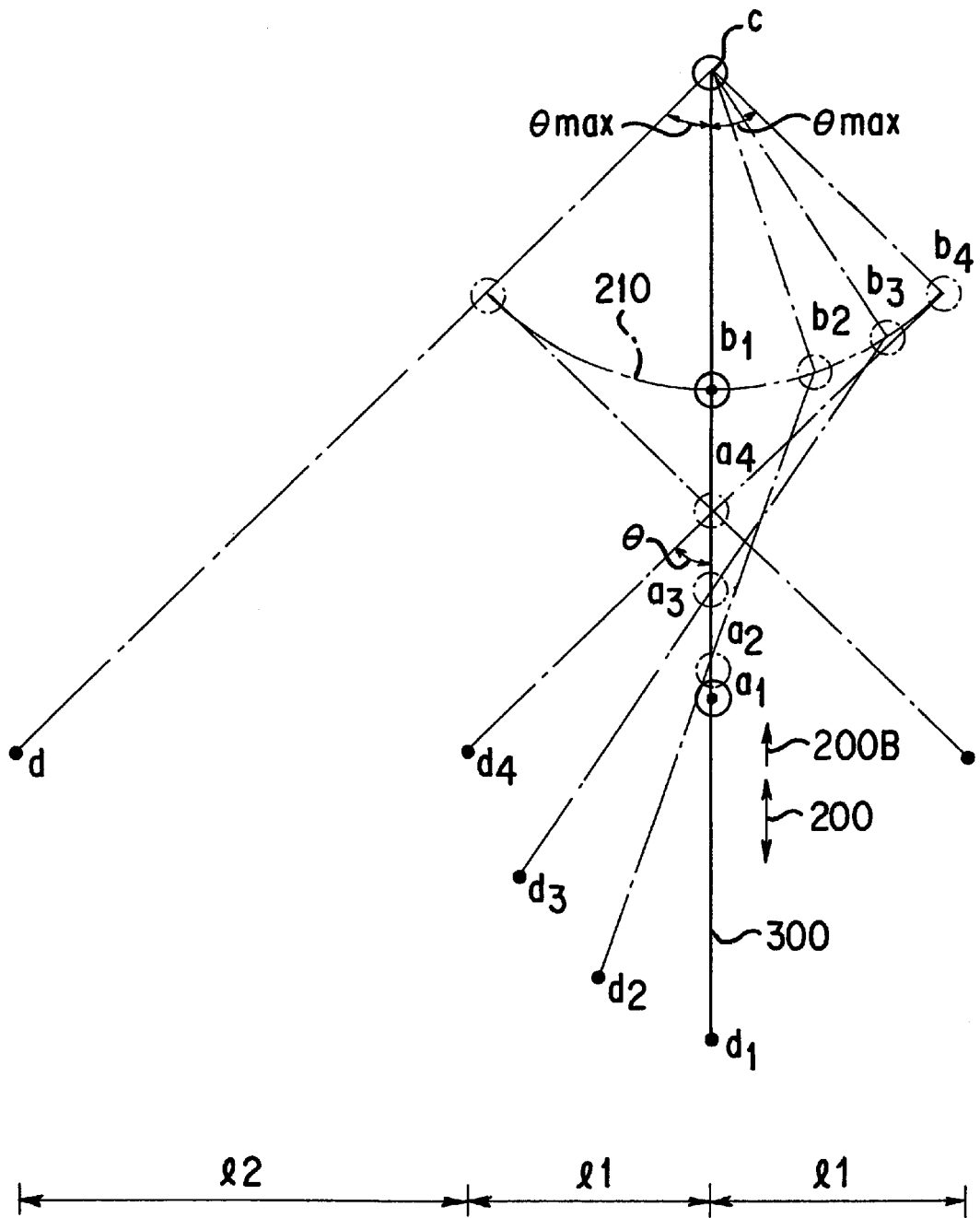
FIG. 6 is an illustrative view of the operation of the action input portion of this first embodiment.

An illustrative diagram of the oscillatory motion of the input board 20 is shown in FIG. 6.

As mentioned previously, the rotational arm 100 is axially supported on the base plate 42 to be freely rotatable about the center of the third rotational axis c. Therefore, the rotational axis b of the second support portion 110 provided at the tip end thereof moves along a circular-arc-shaped movement track 210. This means that the first support portion 90 positioned at the forward end of the input board 20 also moves along the circular-arc-shaped movement track 210.

The moving portion 60 is normally given an elastic force towards the rearward direction 200A by the springs 80. Therefore, in a state in which no external force acts on the input board 20, this elastic force ensures that the center of rotation c and the centers of rotation a and b of the first support portion 50 and the second support portion 110 are positioned on a straight line 300 in FIG. 6. This state is called the basic state and the position of the second center of rotation b at that point is called the neutral point.

If the player oscillates the input board 20 against the elastic force of the springs 80 from this state, the second rotational axis b at the forward end of the input board 20 will move accordingly along the circular-arc-shaped movement track 210, and at the same time the first rotational axis a will move in the forward direction 200B along the straight line 300.

During this time, if the position of the rear end of the input board 20 is assumed to be d, this position d of the rear end portion will move sequentially from d1 to d2 to d3, concomitant with the oscillation in the leftward and rightward direction of the input board 20. At a point at which the angle of oscillation (swing angle) thereof has reached the maximum angle of 40 degrees, the contacting members 86 of the slide table 66 contact with the stoppers 46, regulating the rotation thereof. If the position of the rear end of the input board 20 is assumed to be d4 at this point and the amplitude between the basic position (d1) and a position of the maximum oscillatory angle (d4) of the rear end is taken to be l1, the maximum amplitude of the input board 20 in the leftward and rightward direction is 2l1.

In contrast thereto, if the input board 20 were simply axially supported in such a manner that it rotates along a circular track on the base plate 42, about the center of the rotational axis c positioned at the forward end thereof, the maximum amplitude in one direction of the rear end of the input board 20 would be (l1+l2). If this is considered to be the leftward and rightward direction, the maximum amplitude of the input board 20 in the leftward and rightward direction would be 2(l1+l2).

From this it is clear that the action input portion of the present embodiment makes it possible to reduce the magnitude of the amplitude of the input board 20 (by 2l2) without restricting the angle of oscillation thereof.

In addition, the first support portion 90 (the first rotational axis a) of the action input portion of the present embodiment moves in the forward direction 200B when the input board 20 oscillates in the leftward and rightward direction. This ensures that, during a turn, the player standing on the input board 20 and performing the oscillatory action can experience the physical sensation of moving while the skis are side-slipping in the direction of the turn, so that an even more realistic skiing feeling can be implemented.

Figure 5:
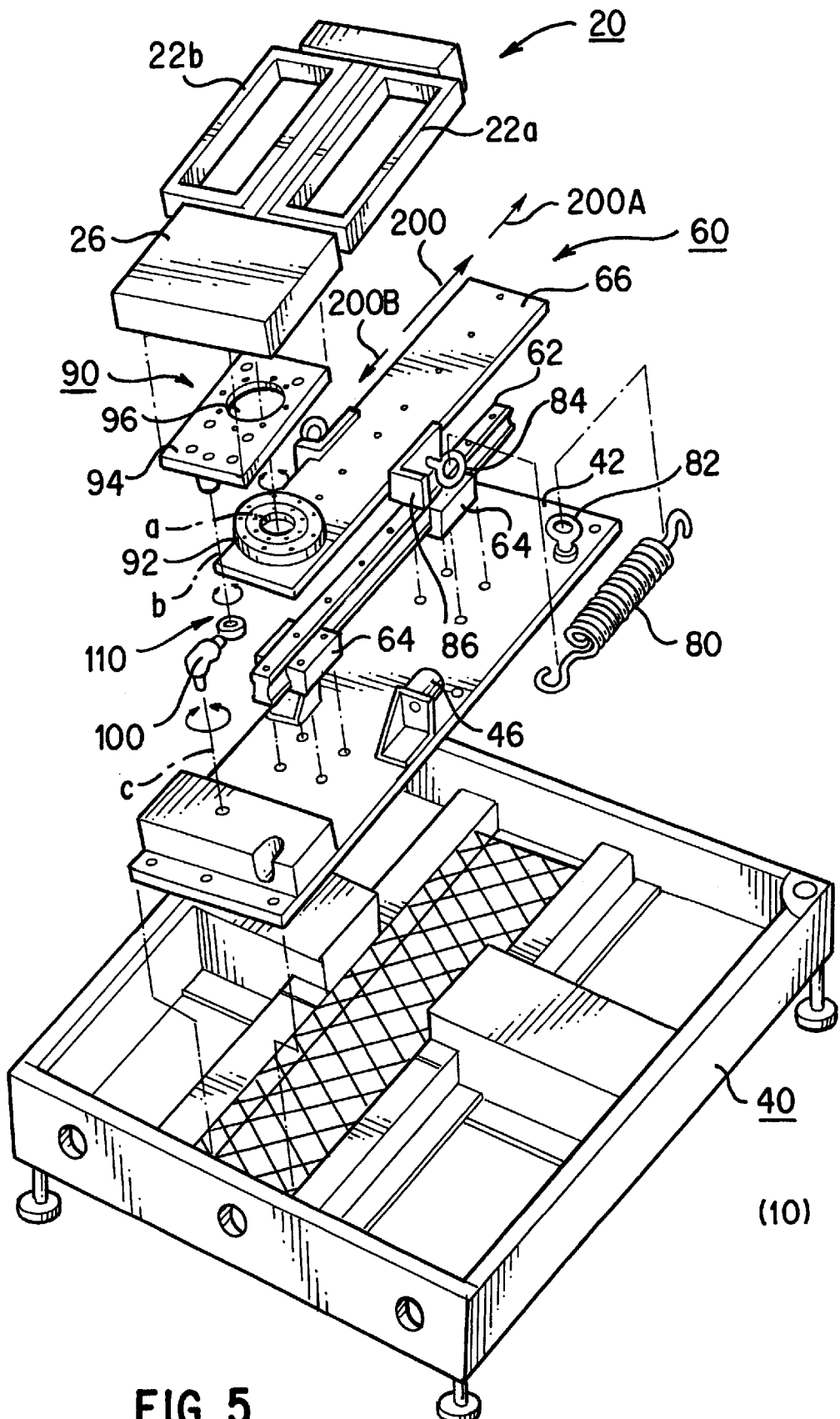
FIG. 5 is an exploded perspective view of a first embodiment of the action input portion of the present invention.
Figure 7:
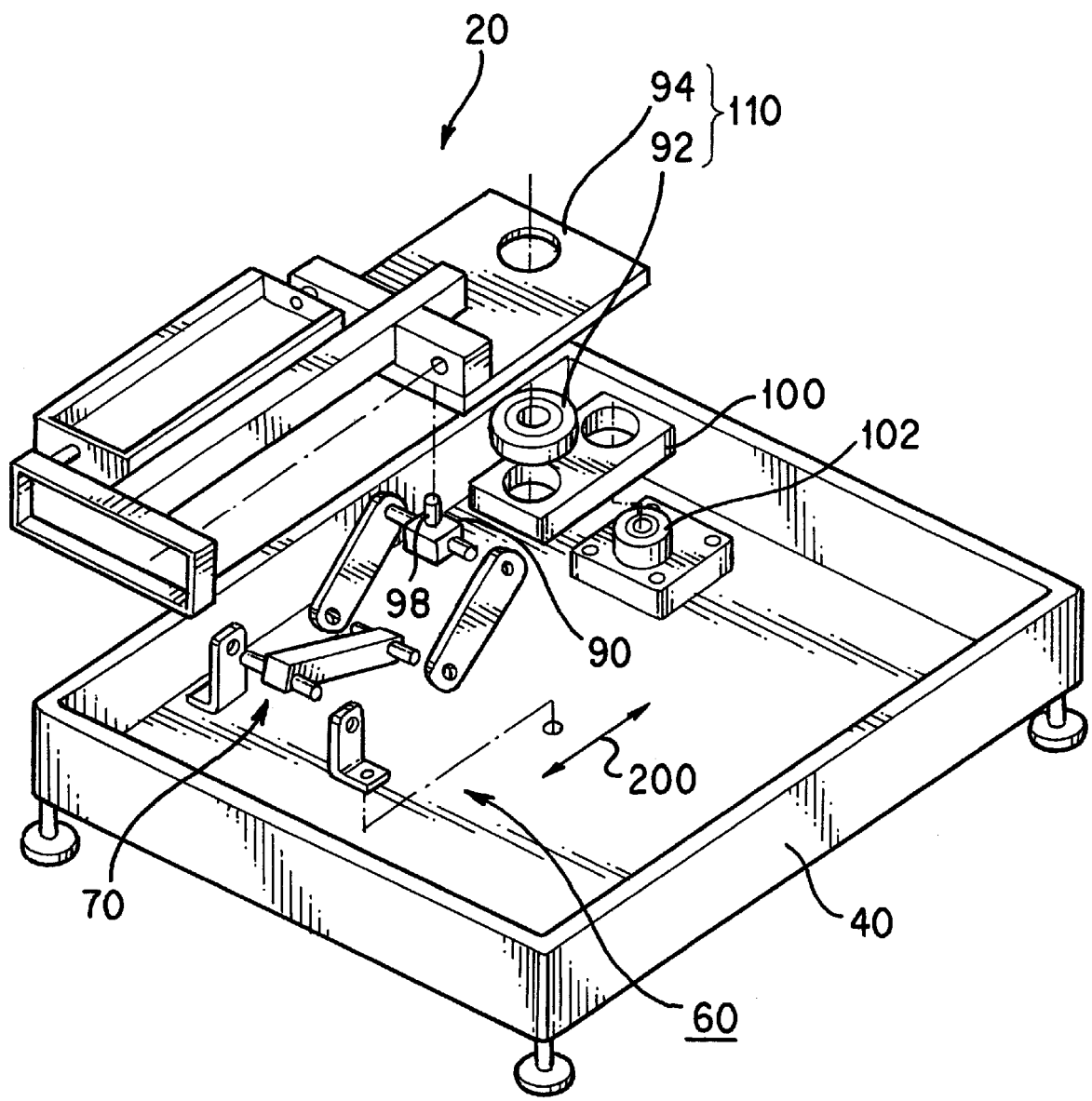
FIG. 7 is an exploded perspective view of a second embodiment of the action input device of the present invention.

Another embodiment of this action input device is shown in FIG. 7. Note that components that correspond to those in the embodiment shown in FIG. 5 are given the same reference numbers and further description thereof is omitted.

In contrast to the first embodiment in which the moving portion 60 was formed as a sliding member, the present embodiment is characterized in that the moving portion 60 is formed by using a direct-linkage mechanism 70.

One end of this direct-linkage mechanism 70 is attached firmly to a lower surface of the base portion 40 and the other end thereof expands and contracts in the direction shown by the arrows 200 in the figure.

The other end of this direct-linkage mechanism 70 is attached in a freely rotatable manner to the input board 20 with the first support portion 90 therebetween. The first support portion 90 comprises a rod 98 provided at the other end side of the direct-linkage mechanism 70 and a bearing portion (not shown in the figure) provided on the bearing table 94 for supporting the rod 98 in a freely rotatable manner.

Note that the input board 20 of the first embodiment was configured to be supported on the moving portion 60 with the first support portion 90 therebetween, but the moving portion 60 Of the present embodiment uses the direct-linkage mechanism 70 so that this support cannot be provided. For that reason, the rotational arm 100 of the present embodiment is constructed to have sufficient strength and is attached to the base portion 40 in a freely rotatable manner at the forward end thereof, with a bearing 102 therebetween. The other end of the rotational arm 100 i attached in a freely rotatable manner to the bearing table 94, with the bearing that forms the second support portion 110 therebetween.

This ensures that the input board 20 is supported with sufficient mechanical strength on the base portion 40 with the rotational arm 100 therebetween.

Figure 8:
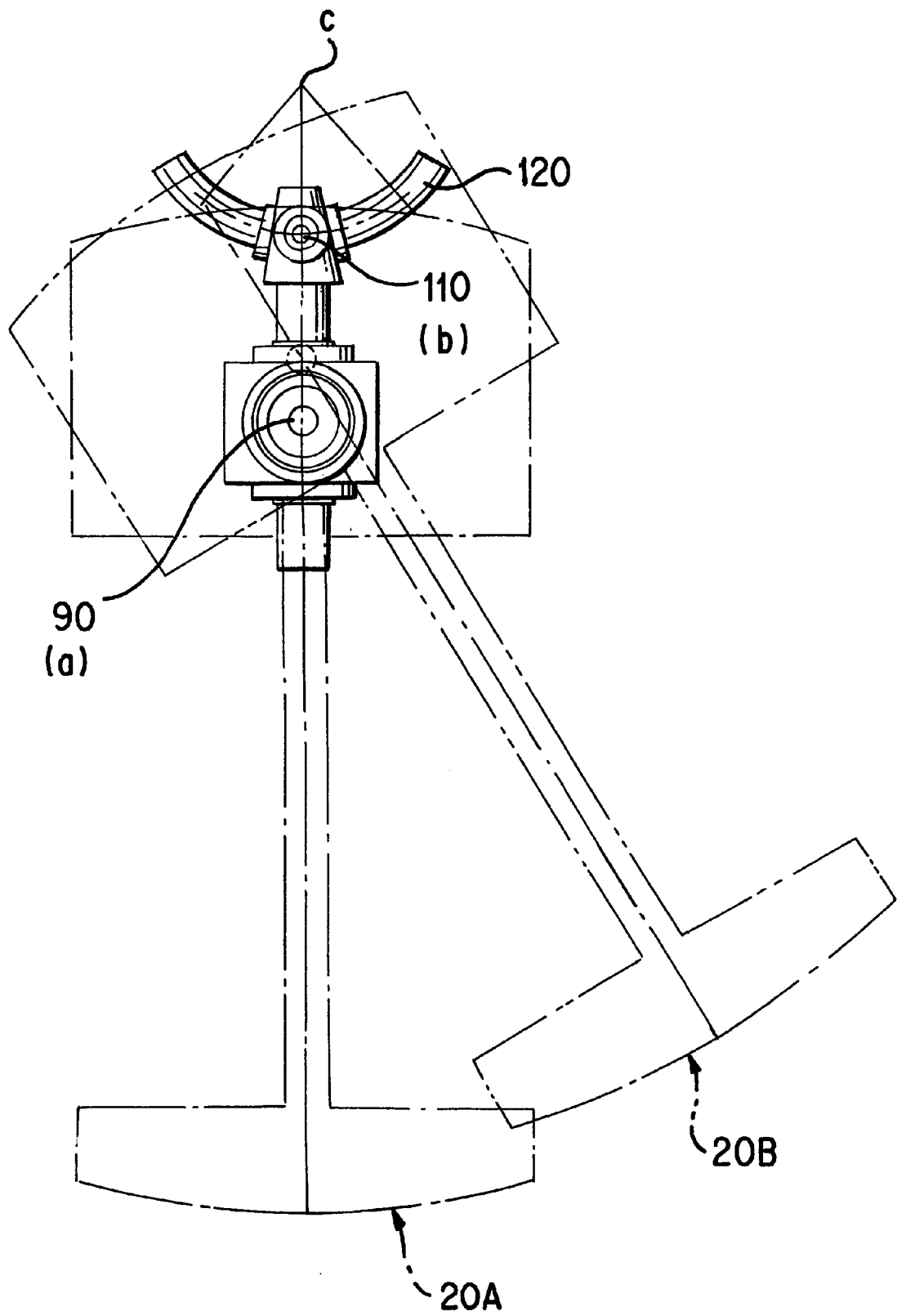
FIG. 8 a schematic plan view of a third embodiment of the action input device of the present invention.

Another embodiment of the action input portion of the present invention is shown in FIG. 8. Note that components that are the same as those of the first embodiment are given the same reference numbers and further description thereof is omitted.

A characteristic feature of the present embodiment is the provision on the base portion 40 on a movement rail 120 formed as a circular arc, along which the second support portion 110 moves. The second support portion 110 is formed in such a manner that it moves along this movement rail 120 and it supports the forward end of the bearing table 94 of the input board 20 in a freely rotatable manner.

This makes the rotational arm 100 of the first embodiment unnecessary, while still making it possible for the input board 20 to oscillate in a similar manner to that of the first embodiment.

Note that the movement rail 120 of the embodiment shown in FIG. 8 is described by way of example as being formed in a circular arc centered on an imaginary third rotational axis c, but the movement route of the present embodiment is not limited thereto and it can be set to be any other route if necessary.

For example, the movement route of this movement rail 120 could be set to be linear in a direction perpendicular to the direction of movement 200 of the moving portion 60

This makes it possible to set the movement route of the second support portion 110 more flexibly than in the first and second embodiments, enabling the implementation of a wider oscillatory motion.

It is preferable that the action input portion of the above embodiments is also provided with means for locking the oscillatory motion of the input board 20 when the game is not being used, as well as means for freely controlling the oscillatory load imparted to the input board 20 during the game.

This locking means could be configured to lock the motion of the moving portion 60 in the forward and backward direction 200 or to lock the rotational movement itself of the input board 20. This means could be such that a solenoid is used to operate a stopper, but it is preferably configured in such a manner that it also gently halts the input board 20 at the end of the game, and locks it. Various components could be used to implement this gentle locking mechanism as necessary, such as a electromagnetic brake, an air cylinder, an electromagnetic fluid damper, an oil damper, or a thrust motor.

The resistance imparting means could be set up to impart a resistance to the moving portion 60 when it is moving. In the forward and backward direction 200 or to impart a resistance when the input board 20 is rotating, in a similar manner to the locking mechanism. This resistance-imparting means could be configured to control the oscillatory load to any value by, for example, using one or a plurality of electromagnetic brakes, air cylinders, magnetic fluid dampers, or oil dampers as necessary.

The present embodiment uses an air cylinder 130 to fulfill both of the functions of locking when the game is over and imparting a resistance during the game, as shown in FIG. 3. A forward end of a cylinder rod 132 of the air cylinder 130 is linked in a freely rotatable manner to the second support portion 110 and the other end of the air cylinder 130 is attached in a freely rotatable manner to the top of the base portion 40, with a rotary support portion 34 therebetween.

In this case, the air cylinder 130 is disposed in a direction that is substantially perpendicular to the direction of movement 200 of the moving portion 60, and the cylinder rod 132 is extended and compressed. In accordance with the movements of the second support portion 110 by controlling the internal air pressure thereof.

To impart a resistance to the oscillatory motion of the input board 20 in accordance with the game status, the internal air pressure is controlled to add a given load when the cylinder rod 132 is extended or compressed.

For example, this control could be such that the load on the air cylinder 130 is reduced when the virtual skier is travelling down a smooth skiing slope, but the load on the air cylinder 130 could be increased in accordance with bumps when the virtual skier is skiing down a slope with large moguls. This makes it possible to implement an even more realistic operation of input board that follows the game status.

To lock the oscillation of the input board 20 at the end of the game, the expansion and compression of the cylinder rod 132 of the air cylinder 130 could be gradually controlled to return the input board 20 gently to the basic state and, the internal pressure of the air cylinder 130 could be controlled in such a manner that the cylinder rod 132 is at complete rest when the input board 20 has reached this basic state. This configuration ensures that the input board 20 can be returned gently to the basic state at the end of the game, the input board can be locked without upsetting the player, and the oscillation of the input board 20 can be completely locked by the air cylinder 130 while the game is not being played.

The above embodiments were described as relating to a three dimensional ski game machine by way of example, but the present invention is not limited thereto; it can equally well be applied to other kinds of simulator, such as a snowboard, skateboard, or surfing simulator.

What is claimed is:

1. An action input device comprising:
    a base member;
    an oscillatory stand formed as a pedestal on which a player stands and rides; and
    an oscillatory mechanism that attaches said oscillatory stand to said base member and that enables said oscillatory stand to oscillate in a lateral direction; said oscillatory mechanism including:
    a movable member attached to said base member so as to be capable of moving in a longitudinal direction;
    a first support portion that supports a first pivot of said oscillatory stand on said movable member in a laterally rotatable manner; and
    a second support portion that supports a second pivot of said oscillatory stand so as to be movable along a given movement track orientated in said lateral direction.

2. The action input device for a simulator as defined in claim 1, wherein:
    said oscillatory stand is modeled to represent at least one of skis, a snowboard, and a skateboard.

3. The action input device for a simulator as defined in claim 1, wherein:
    said movement track is formed in such a manner that a neutral point at which said second support portion is stably positioned lies on a line extended from the direction of movement of said movable member, in a state in which no external force is applied to said oscillatory stand.

4. The action input device for a simulator as defined in claim 1, further comprising:
    a rotational body supported in a freely rotatable manner on said base member at a third pivot positioned forward of the direction of movement of said movable member; and
    wherein said second support portion supports said second pivot of said oscillatory stand at a rotational end side of said rotational body.

5. The action input device for a simulator as defined in claim 1, further comprising:
    a movement path formed in said base member along said movement track; and
    wherein said second support portion is formed to be freely movable along said movement path.

6. The action input device for a simulator as defined in claim 5, wherein said movement path is formed along a circular-arc-shaped movement track that is centered on an imaginary pivot positioned in front of the direction of movement of said movable member.

7. The action input device for a simulator as defined in claim 1, wherein said oscillatory mechanism comprises a locking means for regulating the oscillation of said oscillatory stand.

8. The action input device for a simulator as defined in claim 1, wherein said oscillatory mechanism comprises a resistance imparting means for imparting a resistance to oscillation to said oscillatory stand.

9. A simulator provided with the action input device defined in claim 1.

10. The action input device of claim 1, wherein the second support portion is located in front of said first support portion.

11. The action input device of claim 1, further comprising elastic means that urges the movable member to move rearward along the longitudinal axis.

12. An action input device comprising:
    a base member;
    an oscillatory stand formed as a pedestal on which a player stands and rides; and
    an oscillatory mechanism that attaches said oscillatory stand to said base member and that enables said oscillatory stand to oscillate in a lateral direction, said oscillatory mechanism including:
    a first support of a first pivot, the first support supports the first pivot in a movable manner along a first given movement track, the first pivot supports said oscillatory stand in a laterally rotatable manner; and
    a second support of a second pivot, the second support supports the second pivot in a movable manner along a second given movement track, the second pivot supports said oscillatory stand in a laterally rotatable manner, wherein the first and second given movement tracks are in a same plane and the oscillatory stand moves both longitudinally and laterally when the first pivot moves along the first given movement track and the second pivot moves along the second movement track.

13. The action input device of claim 12, wherein the first given movement track extends longitudinally.

14. The action input device of claim 12, wherein the second given movement track extends laterally along an arc.

15. The action input device of claim 12, wherein the second support is located in front of said first support.

16. The action input device of claim 12, further comprising elastic means that urges the first support.

17. A simulator provided with the action input device of claim 12.

18. An action input method comprising:

moving a first support that supports a first pivot in a movable manner along a first given movement track;

laterally rotating an oscillatory stand on the first pivot;

moving a second support that supports a second pivot in a movable manner along a second given movement track;

laterally rotating the oscillatory stand on the second pivot; and controlling an action according to a lateral direction of the oscillatory stand, wherein the first and second movement tracks are in the same plane and the oscillatory stand moves both longitudinally and laterally when the first pivot moves along the first given movement track and the second pivot moves along the second movement track.

19. The action input method of claim 18, wherein the first given movement track extends longitudinally.

20. The action input device of claim 18, wherein the second given movement track extends laterally along an arc.

* * * * *